United States Patent [19]

Ikeda

[11] 4,056,829
[45] Nov. 1, 1977

[54] DEVICE FOR DETACHABLY MOUNTING A MANUSCRIPT ON A ROTARY CYLINDRICAL DRUM FOR CYLINDER SCANNING TYPE FACSIMILES

[75] Inventor: Masachika Ikeda, Tokyo, Japan

[73] Assignee: Olympus Optical Co. Ltd., Tokyo, Japan

[21] Appl. No.: 693,927

[22] Filed: June 7, 1976

[30] Foreign Application Priority Data

June 11, 1975 Japan .................................. 50-70301

[51] Int. Cl.² ............................................. H04N 1/03
[52] U.S. Cl. ................................... 358/256; 358/291; 358/305; 101/415.1
[58] Field of Search ....................... 358/305, 256, 291; 101/415.1; 242/68

[56] References Cited

U.S. PATENT DOCUMENTS 3,618,123 11/1971 Buddendeck ..................... 101/415.1

Primary Examiner—Robert L. Griffin
Assistant Examiner—Edward L. Coles

[57] ABSTRACT

A device for detachably mounting a manuscript on a rotary cylindrical drum for cylinder scanning type facsimiles. The device comprises a cam operating lever rotatable together with a drum cover, a segmental cam provided at its peripheral edge with stepped cam surface portions, and an arm for operating the clamping bar and having one end rotatably supported by a pin threadedly engaged with a shaft which is perpendicular to the pin and rotatable about its axis, the free end of the arm being resiliently urged against the stepped cam surface portions of the segmental cam and having a block piece for selectively operating the clamping bar. The selective operation of the drum cover only permits to raise the clamping bar from the rotary cylindrical drum so as to remove the manuscript and stop the rotary cylindrical drum and lower the clamping bar toward the rotary cylindrical drum so as to clamp the manuscript to the rotary cylindrical drum and rotate the rotary cylindrical drum.

1 Claim, 8 Drawing Figures

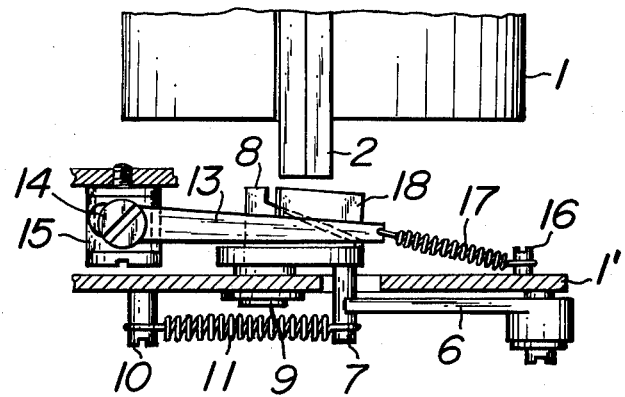
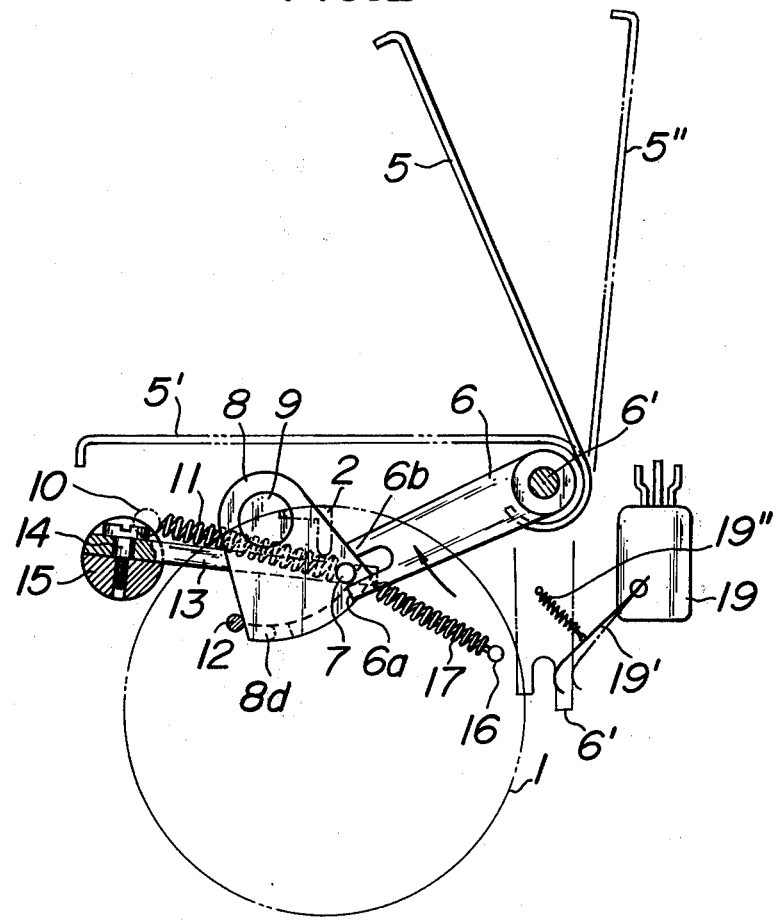

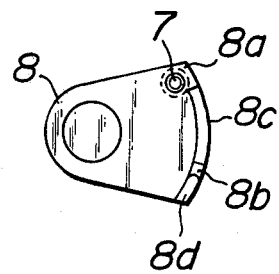
FIG_3a
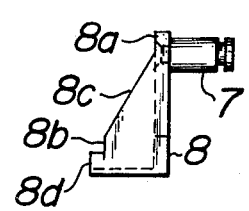
FIG_3b
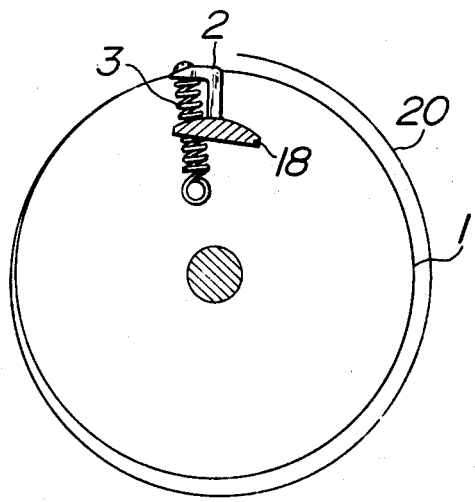
FIG_4
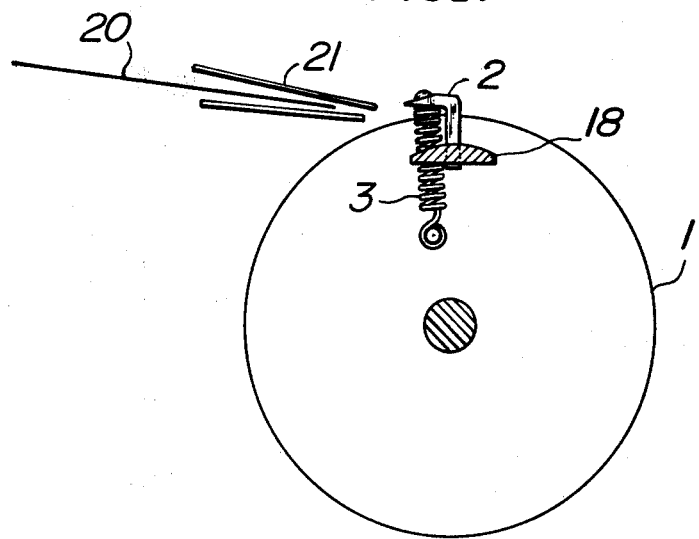
FIG_7

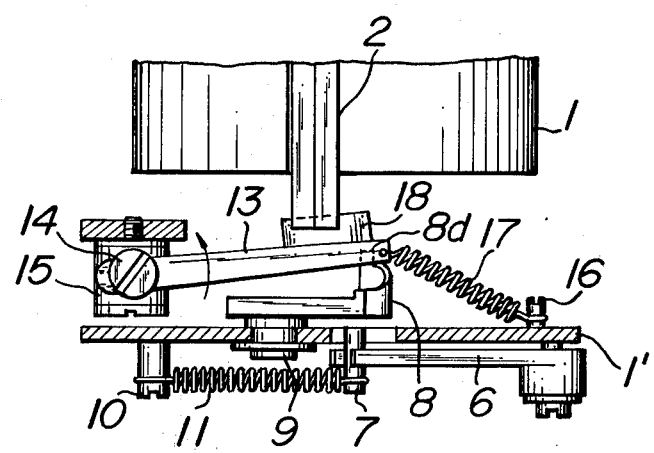
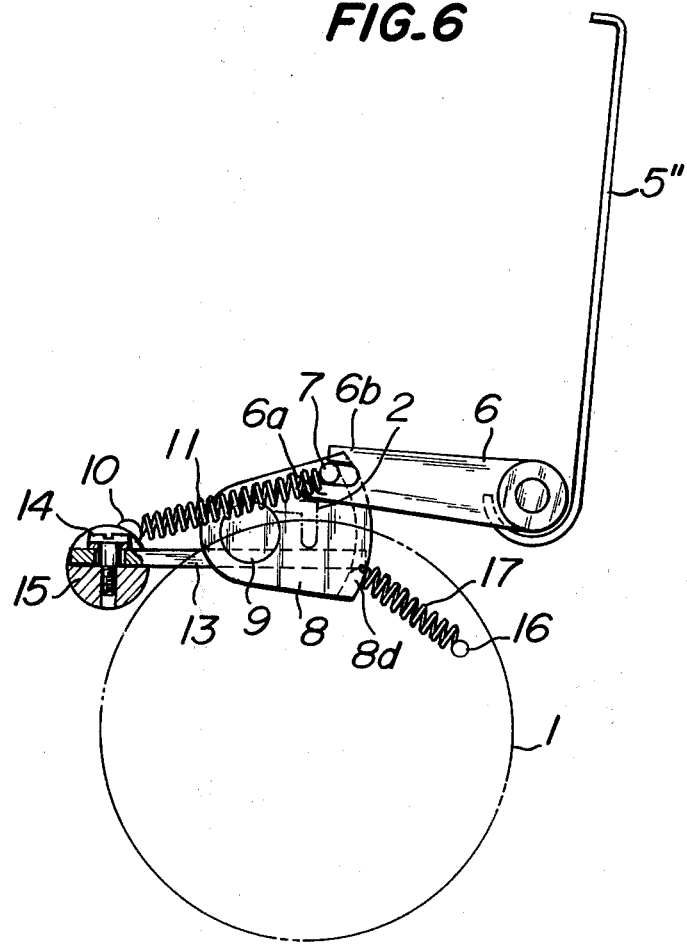

DEVICE FOR DETACHABLY MOUNTING A MANUSCRIPT ON A ROTARY CYLINDRICAL DRUM FOR CYLINDER SCANNING TYPE FACSIMILES

This invention relates to improvement in a device for detachably mounting a manuscript on a rotary cylindrical drum for cylinder scanning type facsimiles.

In a cylinder scanning type facsimile which makes use of a rotary cylindrical drum, it is necessary to wind a manuscript to be transmitted or a sheet of paper to be recorded around the cylindrical drum. In the following the term manuscript shall be understood to include a manuscript to be transmitted and a sheet of paper to be recorded.

Heretofore, it has been the common practice to provide a clamping bar arranged in parallel with an axis of the rotary cylindrical drum and resiliently urged against the peripheral surface thereof and to raise the clamping bar with one hand against the resilient action so as to detachably mount a manuscript on the rotary cylindrical drum. Such conventional device for detachably mounting the manuscript on the rotary cylindrical drum has the disadvantage that the clamping bar must be operated independently of a drum cover so that it is necessary in the first place to open or close the drum cover and then raise or lower the clamping bar in succession thereby rendering the operations troublesome.

An object of the invention, therefore, is to provide a device for detachably mounting a manuscript on a cylindrical drum for cylinder scanning type facsimiles, which is capable of automatically operating a clamping bar when a drum cover is manually operated.

Another object of the invention is to provide such a device having a microswitch with which a driving motor of the cylindrical drum is deenergized as soon as the drum cover becomes opened.

A feature of the invention is the provision of a device for detachably mounting a manuscript on a cylindrical drum for cylinder scanning type facsimiles, comprising a rotary cylindrical drum around which is wound a manuscript, and a clamping bar arranged in parallel with an axis of the rotary cylindrical drum and resiliently urged against the drum so as to detachably mount one end of the manuscript on the drum, said device comprising a drum cover having one end rotatably mounted on a shaft provided for a supporting frame of the device and for opening and closing an opening provided for a casing which encloses the rotary cylindrical durm therein, a cam operating lever having one end made integral with and rotatable together with the drum cover, a segmental cam rotatably mounted on a pivot secured to the supporting frame of the device and provided at its peripheral edge with stepped cam surface portions, said cam being provided with a pin which becomes interlocked with the free end of said cam operating lever when said drum cover arrives at its semi-open position, and an arm for operating said clamping bar and having one end rotatably supported by a pin threadedly engaged with a shaft which is perpendicular to said pin and rotatable about its axis, the free end of said arm being resiliently urged against said stepped cam surface portions of said segmental cam, and having a block piece for selectively operating said clamping bar.

The invention will now be described in greater detail with reference to the accompanying drawings, wherein:

FIG. 1 is a plan view of the relative arrangement of the main parts which are essential for the device according to the invention;

FIG. 2 is its side elevational view;

FIG. 3a is a side elevational view of a segmental cam for use with the device according to the invention;

FIG. 3b is its plan view;

FIG. 4 is a side elevational view of a rotary cylindrical drum, a manuscript being clamped and wound around thereon with the aid of a clamping bar;

FIG. 5 is the same as FIG. 1, but with an arm for operating the clamping bar and displaced directly beneath the clamping bar;

FIG. 6 is a side elevational view of FIG. 5, but with the clamping bar raised from the rotary cylindrical drum; and FIG. 7 is the same as FIG. 4, but with the clamping bar raised from the rotary cylindrical drum, and showing a manuscript to be clamped and wound around the cylindrical drum.

Referring to FIGS. 1 and 2, reference numeral 1 designates a rotary cylindrical drum each end of which is rotatably supported by a supporting frame 1' of the device and around which is wound a manuscript. The rotary cylindrical drum 1 is rotated by a driving motor (not shown) and always kept stopped at a given position by means of a conventional means such as a direct current brake. 2 shows a clamping bar arranged in parallel with a center axis of the rotary cylindrical drum 1 and resiliently urged against the rotary cylindrical drum 1 so as to clamp one end of the manuscript to the rotary cylindrical drum 1. As shown in FIG. 4, the clamping bar 2 is urged against the rotary cylindrical drum 1 by means of a coil spring 3 having one end connected to the clamping bar 2 and another end secured to the supporting frame 1' of the device.

The rotary cylindrical drum 1 is provided at its each end with the device according to the invention which will now be described.

As shown in FIG. 2, the device according to the invention comprises a drum cover 5 and a cam operating lever 6 having one end made integral with the drum cover 5 and rotatably mounted on a common shaft 6'. The cam operating lever 6 is provided at its free end with forked arms 6a, 6b. One of the arms 6a is made longer than the other arm 6b. The device according to the invention further comprises a segmental cam 8 rotatably mounted on a pivot 9 and provided near at its peripheral edge with a pin 7 projected outwardly therefrom. The pin 7 is located on the segmental cam 8 such that the pin 7 is brought into engagement with the longer arm 6a but is not engaged with the shorter arm 6b under the operative position of the segmental cam 8 shown in FIG. 2.

Between the pin 7 and a pin 10 secured to the supporting frame 1' and extending in parallel with the pin 7 is arranged a coil spring 11 which causes the cam 8 to rotate, the rotation of the cam 8 being limited by a stopper pin 12.

In FIGS. 3a and 3b is shown a detailed construction of the segmental cam 8. The cam 8 is provided along its peripheral edge with stepped cam surface portions composed of a lower portion 8a, a higher portion 8b, and a tapered portion 8c extending between the lower and higher portions 8a, 8b. The higher portion 8b is terminated at a projection 8d.

Provision is made of an arm 13 for selectively operating the clamping bar 2. The arm has one end engaged with the above mentioned stepped cam surface portions of the cam 8 as shown in FIG. 5. The other end of the arm 13 is pivotally mounted on a pin 14 so as to rotate the arm 13 about an axis of the pin 14 in a plane which is parallel with the plane of FIG. 5. The pin 14 is threadedly engaged with a shaft 15 having an axis which is perpendicular to the axis of the pin 14. The shaft 15 is made rotatable about its axis. As a result, the arm 13 is also rotatable about the axis of shaft 15 in a plane which is perpendicular to the plane of FIG. 5.

Between the free end of the arm 13 and a pin 16 secured to the supporting frame 1' of the device is arranged a coil spring 17 which serves to urge the free end of the arm 13 against the stepped cam surface portions of the cam 8. As shown in FIG. 5, the arm 13 is provided at its free end with a block piece 18 which is secured to that side surface of the arm 13 which is distant apart from that side surface of the arm 13 which is engaged with the stepped cam surface portions of the cam 8. The block piece 18 has a cross section shown in FIG. 4.

In FIG. 2, reference numeral 19 designates an electrical contact, for example, a microswitch having contacts which are closed through a sliding arm 19' by the cam operating lever 6 when the drum cover 5 arrives at its fully closed position 5' shown in FIG. 2 to energize a drum driving motor and becomes open as soon as the drum cover 5 is started to be opened to deenergized the drum driving motor. The sliding arm 19' is normally biased to a full line position by means of a coil spring 19'' so as to open the microswitch 19.

The device constructed as above described according to the invention will operate as follows.

If the drum cover 5 is brought into its fully closed position 5' shown in FIG. 2, the lever 6 is rotated together with the drum cover 5 and arrives at a dot-dash line position 6' shown in FIG. 2 to close the contacts of the microswitch 19. As a result, the driving motor is energized to rotate the drum 1 whereby the normal scanning of the facsimile is effected.

In the case of replacing the manuscript wound around the drum 1 by a new one, if the drum cover 5 is rotated from its fully closed position 5' to its semi-open position shown by a full line in FIG. 2, the lever 6 is separated from the microswitch 19 to make it open. At such instant, the cylindrical drum 1 is no more driven by the motor. The motor is stopped at a given rotated position by a conventional means such as a direct current brake.

If the drum cover 5 arrives at its full line position shown in FIG. 2, the longer arm 6a of the lever 6 is brought into engagement with the pin 7. If the drum cover 5 is further rotated toward its fully open position 5'', the lever 6 causes the cam 8 to rotate through the pin 7 in a direction shown by an arrow against the action of the spring 11. As a result, the free end of the arm 13 is separated from the lower portion 8a of the cam 8 and rides on the tapered portion 8c which causes the arm 13 to rotate about the pin 14, thereby displacing the block piece 18 directly beneath the clamping bar 2 as shown in FIG. 5.

If the drum cover 5 arrives at position intermediate between the semi-full open position shown by a full line in FIG. 2 and the fully open position 5'', the free end of the arm 13 rides on the higher cam surface portion 8b of the cam 8 and engages with the projection 8d of the cam 8. If the drum cover 5 is further brought into its fully open position 5'' shown in FIG. 6, the lever 6 causes the cam 8 to rotate such that the arm 13 is rotated by the projection 8d about the shaft 15 in a direction shown by an arrow in FIG. 6 to raise the clamping bar 2 by means of the block piece 18 provided at the free end of the arm 13.

In FIG. 7 is shown the raised position of the clamping bar 2 in which a gap is formed between the clamping bar 2 and the drum 1. Into this gap is inserted one end of a manuscript 20 with the aid of guide plates 21.

If the drum cover 5 is rotated from its fully open position 5'' shown in FIG. 6 toward its closed position 5' shown in FIG. 2, the lever 6 is rotated together with the drum cover 5 to operate the arm 13 through the pin 7 of the cam 8 in a manner which is opposite to that described above, thereby bringing the clamping bar 2 into close engagement with the drum 1 as shown in FIGS. 1 and 2. As a result, it is possible to insert and clamp one end of the manuscript 20 between the clamping bar 2 and the drum 1.

During the rotation of the drum cover 5 from its fully open position 5'' shown in FIG. 6 to its semi-closed position shown in FIG. 2, the spring 11 passes over the center axis of the shaft 9 of the cam 8, so that the spring 11 in a position shown in FIG. 2 acts to rotate the cam 8 in a direction which is reverse to the direction of rotation of the cam 8 in FIG. 6. As a result, if the drum cover 5 arrives at that position which is near the full line position shown in FIG. 2, the pin 7 of the cam 8 becomes engaged with the longer arm 6a of the lever 6 and the cam 8 is controlled by the rotation of the lever 6. If the drum cover 5 is rotated from the semi-full open position 5 shown by the full line to the fully closed position 5' shown by the dot-dash lines, the rotation of the cam 8 is stopped by the stopper pin 12.

If the drum cover 5 arrives at its fully open position 5'' shown in FIG. 6, the pin 7 of the cam 8 becomes engaged with the shorter arm 6b of the lever 6 and hence the lever 6 causes the cam 8 to rotate and control.

In addition, during the rotation of the drum cover 5 from its semi-full open position shown by the full line in FIG. 2 to its fully closed position 5' shown by dot-dash lines in FIG. 2, the shorter arm 6b of the lever 6 cam freely pass over the pin 7. As a result, the lever 6 can be rotated from its full line position shown in FIG. 2 to its dot-dash line position 6' without subjecting no influence upon the cam 8, both the cam 8 and the arm 13 being maintained in their respective positions shown in FIG. 2.

If the drum cover 5 arrives at its fully closed position 5', the lever 6 causes the microswitch 19 to close and hence the motor is energized. As a result, it is possible to automatically start the rotation of the drum 1.

The device constructed as above described according to the invention has the advantage that the clamping bar can be operated in a manner interlocked with the opening and closing operations of the drum cover, thereby detachably mounting the manuscript on the rotary cylindrical drum in a rapid and easy manner, and that as soon as the drum cover is begun to be opened, the microswitch becomes opened to deenergize the drum driving motor, and as a result, there is no risk of the drum being rotated when the drum cover is open and the device is safe in operation.

What is claimed is:

1. An apparatus for detachably mounting a manuscript on a cylindrical drum for cylinder scanning type facsimiles, employing a rotary cylindrical drum (1) around which is wound a manuscript (20), a clamping bar (2) arranged in parallel with an axis of the rotary cylindrical drum (1) being resiliently urged against the drum (1) so as to detachably move one end of the manuscript (20) on the drum (1), said apparatus including a drum cover (5) having one end rotatably mounted on a shaft (6') for supporting frame (1') and being disposed to open and close an opening provided for casing means enclosing the drum (1) therein, a cam operated lever (6) being integral and rotatable with drum cover (5) at one end, a segmental cam (8) rotatably mounted on a pivot (9) secured to the supporting frame (1'), said cam (8) having stepped cam surface portions at its peripheral edge formed of a lower portion (8a), a higher portion (8b) and a tapered portion (8c) extending between the lower and higher portions (8a), (8b), the higher portion being terminated at a projection (8d), said cam (8) being further defined by a pin (7) which is connected through a spring 11 passing over the center axis of said pivot (9) of the segmental cam (8) in response to movement of cover (5) from closed to fully open positions, respectively, an arm (13) cooperating with said clamping bar (2) and having one end rotatably supported by a pin (14) threadedly engaged to shaft (15) disposed perpendicular to said pin (14) and rotatable about its axis, the free end of said arm (13) being resiliently urged against said stepped cam surface portion of said segmental cam (8); block piece (18) associated with arm (13) being adapted to selectively operate said clamping bar (2), and microswitch 19 having normally open contacts which close responsive to the operation of said cam operating lever (6) when said drum cover (5) arrives at its fully closed position (5') to thereby energize a driving motor of said drum (1), and the contacts of microswitch (19) being open responsive to opening of said drum cover (5) for deenergization of said driving motor of said drum (1).

* * * * *